United States Patent
Subrahmanyam

(10) Patent No.: US 6,192,513 B1
(45) Date of Patent: Feb. 20, 2001

(54) MECHANISM FOR FINDING SPARE REGISTERS IN BINARY CODE

(75) Inventor: Pratap Subrahmanyam, Sunnyvale, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/184,807

(22) Filed: Nov. 2, 1998

(51) Int. Cl.[7] .................................................. G06F 9/45
(52) U.S. Cl. .................... 717/5; 717/4; 717/8; 714/35
(58) Field of Search .................. 717/4, 5, 6, 7, 717/8, 9; 712/216, 217, 218; 710/260, 261, 266; 709/108, 104; 714/35, 37, 38

(56) References Cited

U.S. PATENT DOCUMENTS

| | | | |
|---|---|---|---|
| 5,265,254 | * 11/1993 | Blasciak et al. | 395/704 |
| 5,386,563 | * 1/1995 | Thomas | 712/228 |
| 5,530,866 | * 6/1996 | Koblenz et al. | 395/708 |
| 5,539,907 | * 7/1996 | Srivastava et al. | 395/705 |
| 5,581,696 | * 12/1996 | Kolawa et al. | 714/38 |
| 5,691,920 | * 11/1997 | Levine et al. | 702/186 |
| 5,717,933 | * 2/1998 | Mann | 710/262 |
| 5,815,701 | * 9/1998 | Slavenburg | 712/244 |
| 6,077,311 | * 6/2000 | Lichtenstein et al. | 717/4 |

OTHER PUBLICATIONS

Deodhar, "Optimizing compiler technology streamlines complex systems", Electronic Design, May 1997, vol. 45 No. 9, pp 153–160.*
Wall, "Register windows vs. register allocation", SIGPLAN '88, ACM, 1988, pp 67–78.*
Larus et al., "EEL: Machine–independent executable editing", SIGPLAN '95, ACM, 1995, pp 291–300.*
Wess et al., "Automatic generation of optimized DSP assembly code", IEEE,1995, pp 979–984.*
Cheng et al., "Code generation for a DSP processor", IEEE,1994, pp 82–87.*

* cited by examiner

*Primary Examiner*—Kakali Chaki

(57) ABSTRACT

The inventive system and method determines the availability of spare registers in binary code for use by an instrument or program by conducting a local search of either the immediate block of program code or of successor blocks, depending upon where instrumenting code is to be inserted. When inserting code near the begining the of a block of code, the system checks for available registers within the current block of code after the intended insertion point. A register is considered available if the original program overwrites its contents in a statement succeeding the insertion point without first having read data from this register between the insertion point and the current program statement. The system logs all registers found to be available within the immediate block of code using this approach. When the insertion point is at or near the end of a block of code, the system checks all immediate successor blocks for available registers in the same manmer as for the single block case. The system then determines which registers are available, or overwritten without prior access, in all of the successor blocks and deems only these registers to be available to the inserted instrumenting code. The system thus assures that the use of registers by instrumenting code at an insertion point near the end of a code block is harmless to data needed by the main program regardless of where main program execution branches to after the current code block.

27 Claims, 2 Drawing Sheets

| | INSTRUCTION | AVAILABLE | UNAVAILABLE |
|---|---|---|---|
| | 1. | | |
| | 2. | | |
| 401 | 3. POINT WHERE INSTRUMENTATION CODE DISIRED | | |
| | 4. | | |
| 402 | 5. REG. A READ FROM | | A |
| 403 | 6. REG. B OVERWRITTEN | B | A |
| 404 | 7. REG. A OVERWRITTEN | B | A |
| | 8. | | |
| 405 | 9. REG. B READ FROM | B | |
| 406 | 10. REG. C OVERWRITTEN | B,C | A |
| 407 | 11. END OF BLOCK | B,C | A |

400    408    409

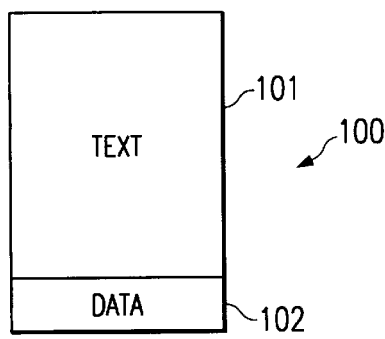
*FIG. 1*
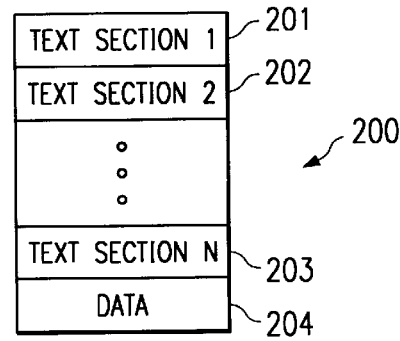
*FIG. 2*
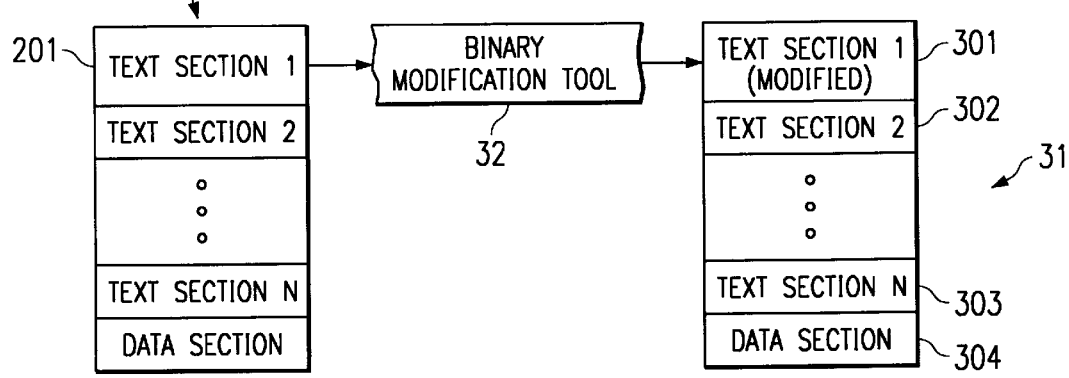
*FIG. 3*
*FIG. 4*
| INSTRUCTION | AVAILABLE | UNAVAILABLE |
|---|---|---|
| 1. | | |
| 2. | | |
| 3. POINT WHERE INSTRUMENTATION CODE DISIRED | | |
| 4. | | |
| 5. REG. A READ FROM | | A |
| 6. REG. B OVERWRITTEN | B | A |
| 7. REG. A OVERWRITTEN | B | A |
| 8. | | |
| 9. REG. B READ FROM | B | |
| 10. REG. C OVERWRITTEN | B,C | A |
| 11. END OF BLOCK | B,C | A |

MECHANISM FOR FINDING SPARE REGISTERS IN BINARY CODE

TECHNICAL FIELD OF THE INVENTION

The invention relates in general to program instrumentation, and in particular to an efficient mechanism for finding spare registers for use in instrumenting programs to measure performance of binary code.

BACKGROUND OF THE INVENTION

Compilers convert a source program that is usually written in a high level language into low level object code, which typically consists of a sequence of machine instructions or assembly language. The constructs in the source program are converted into a sequence of assembly language instructions. To achieve the highest possible efficiency of operation, it is essential to know exactly how much time the program takes to execute. In order to concentrate on those parts of the program that need improvements in efficiency, the length of time that the program takes to execute, and other statistics about the program execution, at the function level, at the loop level, and at the basic block level must be determined. Specialized programs have been used to conduct measurements of the required program performance characteristics necessary to acquire such data.

One such program is the instrumentor either static or dynamic. Instrumentors conduct specific tasks within binary files such as assessing instruction types and adding program code where appropriate. If, for example, a desired point of code insertion is identified, the instrumentor will add program instructions which precede this point so as to monitor the operation of the main program at this point. The instrumentor then rewrites the binary file in a manner such that when the modified program is finally executed, both the original binary instructions and the instrumenting instructions will execute, thus producing output resulting from both the original binary program code, as well as from the instrumenting code.

A problem faced by instrumenting tools after deciding that instrumenting code is to be added to a program, is that of finding temporary storage space in which to store data. Using memory would avoid interference with the main program, but slows execution. It is therefore necessary to use registers, and as many of them as possible. The problem here lies in determining which registers can be used without interfering with operations of the main program. Four principal techniques have been used in the prior art to address this problem.

The first of these prior art techniques involves deciding upon a set of registers for use by the instrumenting program. Then, to preclude interference with the main program by the instrumenting program, the values of the selected registers are saved to memory. The instrumentor performs whatever operations are required for its purposes, employing the selected registers, and then retrieves the original values of the selected registers from memory.

One advantage of this approach is its safety. Because the data originally present in the selected registers is saved to memory and then retrieved after instrumentor operations are complete, the instrumentor does not harm the original data. A further advantage is that during instrumentation, time is saved because the instrumentor does not check the operation of the main program with regard to the selected registers, before saving their contents to memory.

The principal disadvantage of this first approach is that movement of data between the registers and memory locations is slow, and in this case, the contents of all selected registers is saved to memory regardless of whether the data in these registers is useful to the main program or not. As such, there is likely some wasteful data transfer to and from memory using this technique. This movement of useless data to and from memory from the registers is computationally expensive and is a major drawback of this first technique.

The second approach seeks to avoid the time consuming movement of register contents to and from memory by determining which registers contain data to be subsequently accessed by the main program and which do not. This involves a process of global analysis which by itself is quite time consuming. The second technique operates as follows.

At every point in the main program where the instrumentor decides to place instrumenting code, the registers available for instrumentation have to be identified. Arcs or lines are drawn between the points in the program where data in particular registers is stored and accessed. If the point in the program where the instrumentor seeks to place code is in between the points where data is stored in a register and data from this register is accessed, the register is deemed unavailable for instrumentation. Once a sufficient number of available registers is identified, the instrumentor uses these identified registers for the instrumenting code needed at that point in the program. This analysis must be performed at every point where instrumentation code is to be inserted.

The advantages of this approach are that it is safe and precise. It is also quick to run in the execution phase because the data traffic between the registers and memory mentioned in the first technique is absent here. The main disadvantage is that the register availability determinations made during the instrumenting phase are time consuming. Here, there is slow instrumentation and rapid execution which is the opposite of the situation in the first technique.

A distinguishing characteristic of the first two approaches is that they are both applicable to situations where the designer of the instrumenting program has no control over the design of the original or main program, and no provision is made in the main program to provide for the instrumentation program. The following two techniques address situations where there is some cooperation between the design of the original program and the instrumenting program.

The third technique involves cooperation between the development of the original compiler program and the instrumentor program in the form of expressly reserving certain registers for use by the instrumentor program when designing the original compiler program. Using this approach, the instrumentor program has the advantages associated with both of the first two techniques discussed above, with none of the disadvantages. Since the registers are set aside in advance, the instrumentor program is not burdened with the need to check for availability of the registers. The arrangement is such that the compiler program will not have used these registers and will therefore not have any data in them to be destroyed. Further, assuming that a sufficient number of registers has been set aside, the instrumentor program will not have to transfer data between the registers and memory, thereby obviating the need for this time consuming data transfer process.

One disadvantage associated with the third technique is that the reservation of registers for the instrumentor program reduces the number of registers available for the compiler program. The compiler program, which is written in anticipation of the need for registers by an instrumentor program, will likely have to move data between registers and memory more often than it would otherwise because of the reduced number of available registers. The compiler program is therefore likely to run more slowly. Further, many compiler programs written in anticipation of the use of instrumenting programs will never in fact be instrumented. Therefore, it is a further disadvantage that the burden imposed on the compiler program may be uncompensated by a benefit to an instrumenting program.

A fourth technique uses a looser form of cooperation between compiler and instrumentor. The compiler program is written taking full advantage of the registers provided by the processor, thus permitting optimum execution efficiency. The compiler program however, leaves information embedded in the program, at the bottom of each basic block of code for the instrumentor program to read, indicating which registers are available for use by the instrumentor program in that block. Compilers typically have to acquire such information anyway, so presenting such information for reading by the instrumentor program imposes little additional burden on the compiler program.

If, for a particular block of code, no registers are available, the instrumentor program reverts to the first technique discussed above. It preserves the contents of a selected number of registers in memory and proceeds to use those registers for instrumenting operations within that block Although this process is computationally expensive, unlike with the first technique, it is used only when no registers are available, and thus does not needlessly save useless data to memory.

The principal disadvantage of this fourth technique is that the embedded register availability information referred to above occupy substantial disk space. In a typical compiler program, supplying the required information about available registers could increase the size of the compiler program by half This tends to inconvenience customers by occupying more of their hard disk space, and can slow down the operation of an overall system by requiring more transfer of data between disk and memory.

Therefore, there is a need in the art for an instrumenting program which will execute rapidly, permit the original compiler program execute rapidly, and protect all data needed by the original program code. There is a further need in the art for an instrumenting program which will not cause the compiler to require additional memory space. There is a still farther need in the art for an instrumenting scheme which will not require advance cooperation in the design of the compiler program and the instrumenting program.

SUMMARY OF THE INVENTION

These and other objects, features and technical advantages are achieved by a system and method which searches, near the point of intended insertion of instrumenting code (the "insertion point"), for nearby subsequent code in which register data is overwritten, without there having been an intervening transfer of data from the register to the program, between the point of insertion and the pertinent program step. Since the data in a register identified in the foregoing manner is overwritten by the main program without having been read after the insertion point, the data is useless to the main program from the insertion point forward and the register containing such data is available to the instrumentor without any possibility of damage to the operation of the main program.

If the instrumentor needs to insert instructions near the beginning of a basic block of original code, it will search the current block of original code for available registers. It has generally been observed in practice that registers sufficient for the needs of the instrumentor are usually available reasonably close to where the instrumenting code is to be placed. Any registers found to be available within the current block can be used by the instrumentor program.

If, on the other hand, the instrumentor needs to insert code at or near the end of a basic block of code, the instrumentor will look at the immediately succeeding block(s) of code to search for available registers. There can be more than one succeeding block where branching can direct execution to more than one possible successor block. In this case, for a register to be deemed available, its data must be provisionally available in all possible successor blocks. To identify provisionally available registers, the instrumentor checks each of the succeeding blocks for available registers in the same manner as was done for the single block search discussed above. Registers found to be available according to the single block search method described above are deemed provisionally available. The registers actually available for instrumentor use are found in the intersection set of the sets of provisionally available registers identified in each successor block.

By way of example only, if successor block B overwrites registers 1, 3, 4, 5, and 9 without first reading from them, and successor block C overwrites registers 2, 4, 5, 8, and 9 without first reading from them, the intersection set "B n C," registers 4, 5, and 9, are the registers actually available for use by the instrumentor program.

In the event that no register is available using the above approach, the instrumentor will revert to selecting certain registers for use, saving their contents to memory, and then returning data to the registers after the instrumenting code has been run. It is anticipated that the required registers will be found most of the time, thereby obviating the need to resort the more computationally expensive option of saving the register contents to memory.

Therefore, it is a technical advantage of the invention to rapidly and safely find available registers for an instrumenting program. The searches are local, not global and therefore computationally inexpensive.

It is another technical advantage of the invention of the invention to avoid having to engage in the time consuming task of automatically saving the register contents to memory every time instrumenting code needs to use a set of registers. As indicated above, the inventive approach will resort to this older mechanism only when no registers are available.

It is a further technical advantage of the invention to avoid the computationally expensive method of conducting global searches to determine whether individual registers are available, as was discussed in connection with the second prior art method. The searching in the present invention is local, not global, and can be accomplished very quickly.

It is a still further technical advantage of the invention to not burden the main compiler program by reducing the number of registers available for its use. Therefore, the instrumentor will find the registers it needs without burdening the compiler.

It is a further technical advantage of the invention to not increase disk space requirements by embedding register availability information in the original code of the compiler as mentioned in the discussion of the fourth prior art method.

It is a further technical advantage of the invention that no advance handshaking or cooperation between the development of the compiler and the instrumenting code is required. Here, the instrumentor functions entirely independently of the compiler. This is advantageous as cooperation between the programs can be difficult to arrange when for instance, they are produced by different people in different companies.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof reference is now made to the following descriptions taken in conjunction with the accompanying drawings, in which:

FIG. 1 depicts a representation of a compiler program having both text and data portions;

FIG. 2 depicts a representation of a compiler program where the text portion has broken up into N text sections;

FIG. 3 depicts a compiler instrumentation scheme;

FIG. 4 depicts a basic block of code to which instrumentation code will be added;

DESCRIPTION OF THE INVENTION

Figure 5:
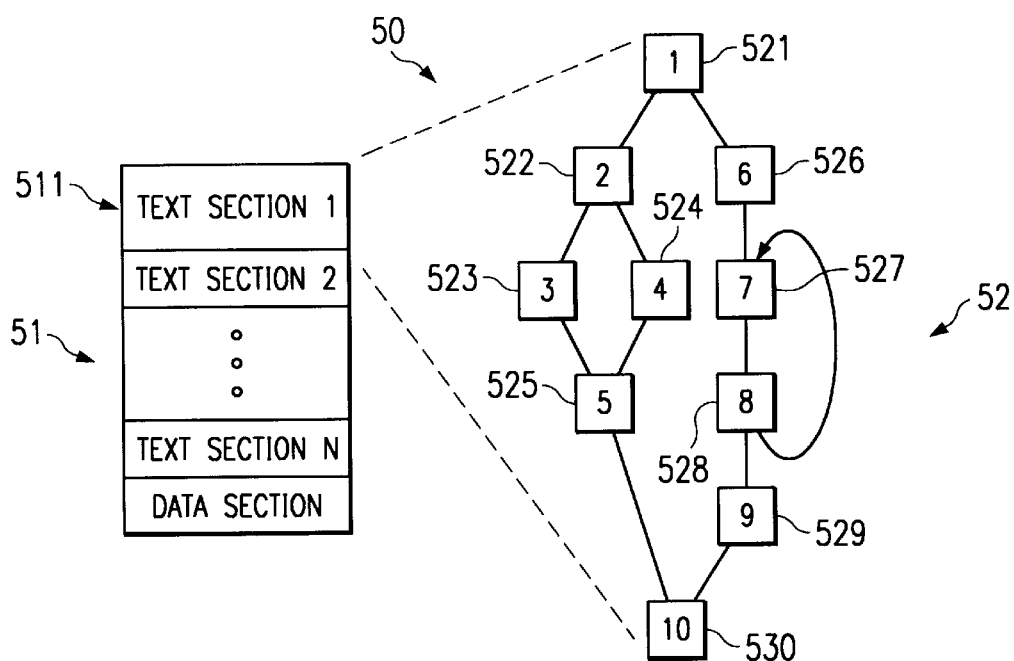
FIG. 5 depicts a compiler program representation accompanied by control flow graph.

FIG. 1 depicts a simple representation of a compiler program 100 having a text portion 101 and a data portion 102. FIG. 2 depicts this compiler program 200 with the text portion 101 broken down into a plurality of text sections starting with text section 1 201, followed by text section 2 202, finishing with text section N 203. The data portion 204 remains unchanged from that depicted in FIG. 1. FIG. 3 depicts a compiler instrumentation scheme 300. The binary modification tool 32 operates on text section 1 201 of the compiler program 200 thereby producing the instrumented compiler program 31, containing modified text section 1 301.

FIG. 4 depicts a basic block of code 400 containing a point where instrumentation code is desired ("instrumentation point") 401. This block illustrates the version of the inventive mechanism for quickly finding spare registers which operates within one sample basic block of code. The instrumentor looks at code after the instrumentation point, instruction 3 401, but within the same basic block 400 to determine register availability. As of instruction 3 401, the inventive mechanism does not know which registers are available or unavailable. Instructions not affecting the contents of registers are marked with dashed lines.

The operative principle is that registers, which are overwritten after the instrumentation point 401 without having been read from in between the instrumentation point 401 and the point where they are overwritten, are deemed to be available since the information contained in such registers was not going to be accessed by the main program after the instrumentation point. Registers which are read from after the instrumentation point 401 without having been overwritten by the program in between the instrumentation point 401 and the point where they are overwritten are deemed unavailable as such registers have information which the program still needs. Registers whose status is unknown are considered unavailable by default.

The available registers list 408 keeps track of all registers found to be available. The unavailable registers list 409 keeps track of all registers found to be unavailable. For example, at instruction 5 402, the program reads information from register a. This means that information required by the program resided in register a when execution reached instruction 5 402. The instrumentation code could therefore not have been permitted to use this register. Accordingly, register a is unavailable and so is appropriately placed in the list of unavailable registers 409.

Proceeding to instruction 6 403, it is observed that register b is overwritten without having been read from between the instrumentation point 401 and instruction 6 403. The information in register b was therefore useless to the program as of the instrumentation point 401, and register b is therefore considered available. Register b is accordingly placed in the available registers list 408.

At instruction 7 404, register a is overwritten. This has no effect on its availability however, as register a was previously determined to be unavailable. Thus, there is no change in the lists of available registers 408 or unavailable registers 409. Once a register is deemed to contain valuable information at the point of instrumentation 401, no subsequent treatment of that register changes this status.

At instruction 9 405, the program reads information from register b. The program will read from register b whatever was placed there in instruction 6 403. Since the program writes to register b in between the instrumentation point 401 and instruction 9 405, there is no change in the availability status of register b for instrumentation purposes, since the instrumenting code will not disrupt the data read from register b in instruction 9 405.

At instruction 10 406, register c is overwritten. In like manner to register b in instruction 6 403, register c has been overwritten without the program having accessed register c in between the instrumentation point 401, and instruction 10. Accordingly, the information contained in register c at the instrumentation point 401 would never again be accessed by the compiler program, and register c is accordingly deemed to be available, and appropriately added to the list of available registers 408.

At instruction 11 407, execution has reached the end of the current basic block. Therefore, for the inventive mechanism version which searches only within the block where instrumenting code is to be inserted, the register search is now complete. At the conclusion of the search, the available registers list 408 contains registers b and c, and the unavailable registers list 409 contains register a. FIG. 5 depicts a compiler program representation 50 containing a text and data representation 51, whose text section 1 511 has been expanded into control flow graph 52. Control flow graph 52 shows basic blocks 1 521 through 10 530. If the instrumentor seeks to place instrumenting code at the end of a basic block, unlike the situation depicted in FIG. 4, there is no further code to search through in the immediate block. Consequently, in order to search for spare registers, the instrumentor will look to the basic block or blocks which immediately succeed the present block. As an example of the simplest case, if the instrumentor seeks to insert code at the end of block 5 525, the instrumentor will look through block 10 530 for spare registers. No other block need be searched, as the inventive mechanism looks just one block downstream from the insertion point, and in this case, block 5 is succeeded only by block 10 530. The search for spare registers within any one block proceeds in the manner described in the discussion of FIG. 4 above.

If the instrumentor needs to insert code at the end of block 1 521, it would check blocks 2 522 and 6 526 for spare registers because program execution could branch to either one of these registers. The registers actually available for instrumenting code at the end of block 1 521 is the intersection set of the sets of spare registers in blocks 2 522 and 6 526. This intersection set is called the "kill set," as the data in these registers is "killed" by being overwritten by the compiler program. The registers in the kill set are available for use in the instrumenting code at the end of block 1 521 because the registers in this set have been found to be safe no matter which block execution branches to after block 1 521. The same principle applies for any number of blocks which immediately succeed the block in which instrumenting code is to be inserted. In all cases, the general approach is to find the spare registers in each block as discussed for FIG. 4 above, and then to identify the spare registers which are common to all immediately succeeding blocks thereby forming the intersection set. The same approach would apply to code to be inserted at the end of block 2 522 and in need of spare registers in blocks 3 523 and 4 524.

In the case of a loop between two blocks as shown between blocks 7 527 and 8 528, the basic principle of operation remains unchanged. If instrumented code is to be placed at the bottom of block 8, successor blocks 9 and 7 would have to checked for spare registers and an intersection set formed in the same manner as discussed for blocks 2 and 6 above.

Returning to the case of block 1 521, the options available where no spare registers are found is considered. It is presumed here that the instrumentor, wishing to place instrumenting code at the end of block 1 521, searches for spare registers in blocks 2 522 and 6 526 and either finds no spare registers at all, or finds no spare registers in common between blocks 2 522 and 6 526. There are two basic options at this point.

The preferred option is to accept that under the existing register search scheme, no registers are available, and to resort to saving the contents of a certain number of selected registers to memory, performing the operations required with these registers and then restoring the original data to these registers after the instrumenting operations are complete. This method assures the safety of the data originally contained in the registers but incurs the processing time associated with moving data between the registers and memory.

An alternative option upon discovering a null set of spare registers is to expand the search inventive mechanism. The search inventive mechanism can be set up to look further downstream in order to find spare registers. For example, instead of looking only to the immediate successor blocks, the instrumentor could look two or more blocks downstream searching for spare registers within each block and identifying a kill set by comparing the spare registers identified in all of the blocks examined. This option avoids the demands of transferring data between the registers and memory but incurs the processing time associated with the expanded search. Deciding between the two options will rest in comparing the computing demands of transferring data between registers and memory against those of conducting more extensive searches for spare registers.

Figure 6:
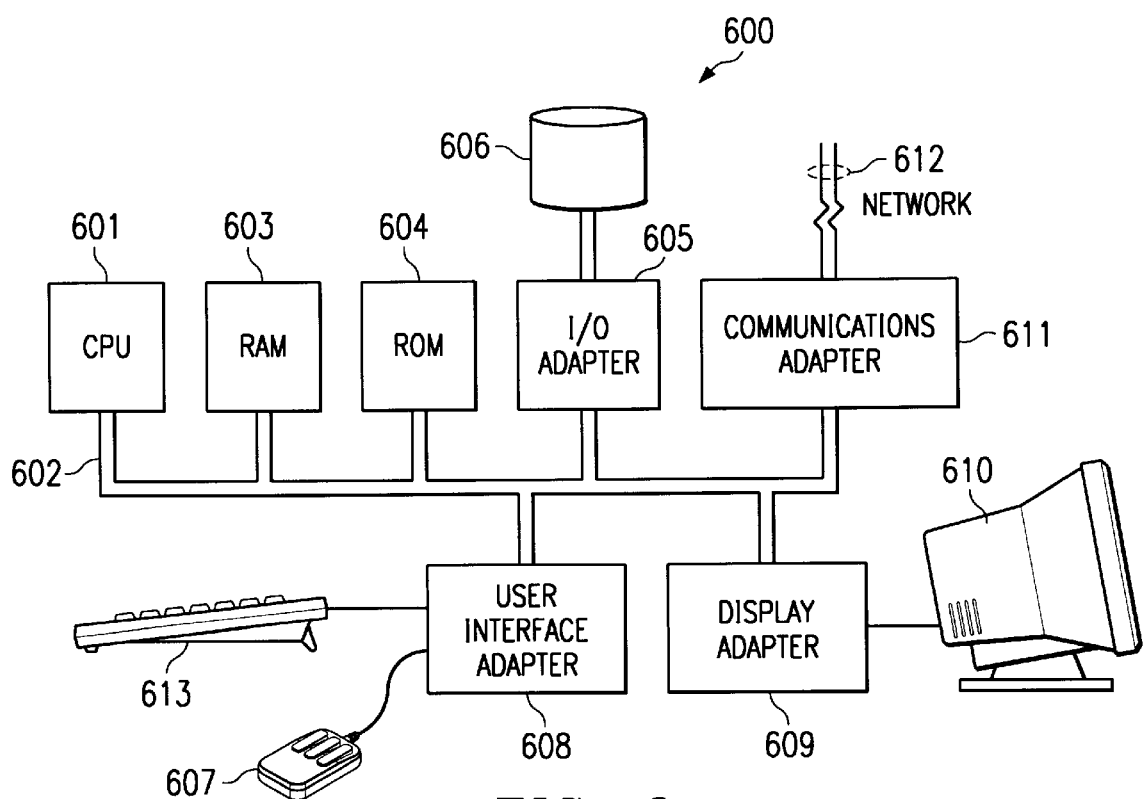
FIG. 6 depicts a computer system adapted to use the present invention.

FIG. 6 depicts a computer system 600 adapted to use the present invention. Central processing unit (CPU) 601 is coupled to bus 602. In addition, bus 602 is coupled to random access memory (RAM) 603, read only memory (OM) 604, input/output (I/O) adapter 605, communications adapter 611, user interface adapter 608, and display adapter 609.

RAM 603 and ROM 604 hold user and system data and programs as is well known in the art. I/O adapter 605 connects storage devices, such as hard drive 606 or CD ROM (not shown), to the computer system. Communications adaptor 611 couples the computer system to a local, wide-area, or Internet network 612. User interface adapter 608 couples user input devices, such as keyboard 613 and pointing device 607, to the computer system 600. Finally, display adapter 609 is driven by CPU 601 to control the display on display device 610. CPU 601 may be any general purpose CPU, such as a HP PA-8200. However, the present invention is not restricted by the architecture of CPU 601 as long as CPU 601 supports the inventive operations as described herein.

Although the present invention and its advantages have been described in detail, it should be understood that various changes, substitutions and alterations can be made herein without departing from the spirit and scope of the invention as defined by the appended claims.

What is claimed is:

1. A method for identifying at least one data storage element referenced in existing program code available for use by inserted code, wherein the program code references a plurality of data storage elements, the method comprising the steps of:

identifying an insertion point in said program code where at least one data storage element is required;

reviewing program code statements succeeding said insertion point for usage of said plurality of data storage elements;

determining availability of said plurality of data storage elements based upon reviewed usage of the plurality of data storage elements by the program code; and selecting said at least one data storage element from available data storage elements.

2. The method of claim 1, wherein the step of reviewing ends at the conclusion of a predetermined block of code.

3. The method of claim 1, wherein the method is performed by a compiler.

4. The method of claim 1, wherein available data storage elements are capable of being used by an instrumenting program.

5. The method of claim 1, wherein the data storage elements are registers.

6. The method of claim 1, wherein the existing program code is in binary form.

7. The method of claim 1, wherein the step of reviewing is conducted over a range of existing program code having only one execution path.

8. The method of claim 7, wherein the step of determining available storage elements comprises the step of:

locating program statements succeeding said point of insertion that transmit data to storage elements from which no data has been received by said existing program code; and wherein the storage elements to which data has been transmitted in the located program statements are available.

9. The method of claim 1, wherein the step of reviewing is conducted over a range of program code comprising multiple parallel execution paths.

10. The method of claim 9, wherein the step of determining available storage elements comprises the steps of:

locating program statements succeeding said insertion point in all parallel execution paths succeeding said insertion point, that transmit data to storage elements from which no data has been received by said existing program code;

wherein the storage elements to which data has been transmitted in the located program statements are overwritten storage elements; and identifying overwritten storage elements in common among all the parallel execution paths, said common overwritten storage elements being available.

11. The method of claim 2, wherein the block of code comprises a loop.

12. The method of claim 10, wherein at least one said parallel path succeeding said insertion point comprises a loop.

13. The method of claim 10, wherein:

a block of code contains the insertion point;

at least one block immediately succeeds the block containing the insertion point; and the step of reviewing ends at the conclusion of said at least one block of code subsequent to the block containing the insertion point.

14. A system for identifying at least one data storage element referenced in existing program code available for use by inserted code, wherein the program code references a plurality of data storage elements, the system comprising:

means for identifying an insertion point in said program code where at least one data storage element is required;

means for reviewing program code statements succeeding said insertion point for usage of said plurality of data storage elements;

means for determining availability of said plurality of data storage elements based upon reviewed usage of the plurality of data storage elements by the program code; and means for selecting said at least one data storage element from available data storage elements.

15. The system of claim 14, wherein the means for reviewing stops reviewing code at the conclusion of a predetermined block of code.

16. The system of claim 14, wherein the system comprises a compiler.

17. The system of claim 14, wherein available data storage elements are capable of being used by an instrumenting program.

18. The system of claim 14, wherein the data storage elements are registers.

19. The system of claim 14, wherein the existing program code is in binary form.

20. The system of claim 14, wherein the means for reviewing comprises means for reviewing a range of existing program code having only one execution path.

21. The system of claim 20, wherein the means for determining available storage elements comprises:

means for locating program statements succeeding said point of insertion that transmit data to storage elements from which no data has been received by said existing program code;

wherein the storage elements to which data has been transmitted in the located program statements are available.

22. The system of claim 14, wherein the means for reviewing reviews a range of program code comprising multiple parallel execution paths.

23. The system of claim 22, wherein the means for determining available storage elements comprises:

means for locating program statements succeeding said insertion point in all parallel execution paths succeeding said insertion point, that transmit data to storage elements from which no data has been received by said existing program code;

wherein the storage elements to which data has been transmitted in the located program statements are overwritten storage elements; and means for identifying overwritten storage elements in common among all the parallel execution paths, said common overwritten storage elements being available.

24. The system of claim 15, wherein the block of code comprises a loop.

25. The system of claim 23, wherein at least one said parallel path succeeding said insertion point comprises a loop.

26. The system of claim 23, wherein:

a block of code contains the insertion point;

at least one block immediately succeeds the block containing the insertion point; and the means for reviewing stops reviewing code at the conclusion of said at least one block of code subsequent to the block containing the insertion point.

27. A computer program product for identifying at least one data storage element referenced in existing program code available for use by inserted code, wherein the program code references a plurality of data storage elements, the computer program product comprising:

means for identifying an insertion point in said program code where at least one data storage element is required;

means for reviewing program code statements succeeding said insertion point for usage of said plurality of data storage elements;

means for determining availability of said plurality of data storage elements based upon reviewed usage of the plurality of data storage elements by the program code; and means for selecting said at least one data storage element from available data storage elements.

* * * * *